3,390,059
VACUUM DISTILLATION OF DIMETH-
YLMETADIOXANE FROM AN ACIDIC
AQUEOUS PHASE
Clarence R. Murphy, Allison Park, Pa., assignor to Gulf
Research & Development Company, Pittsburgh, Pa., a
corporation of Delaware
Filed May 12, 1964, Ser. No. 366,717
8 Claims. (Cl. 203—94)

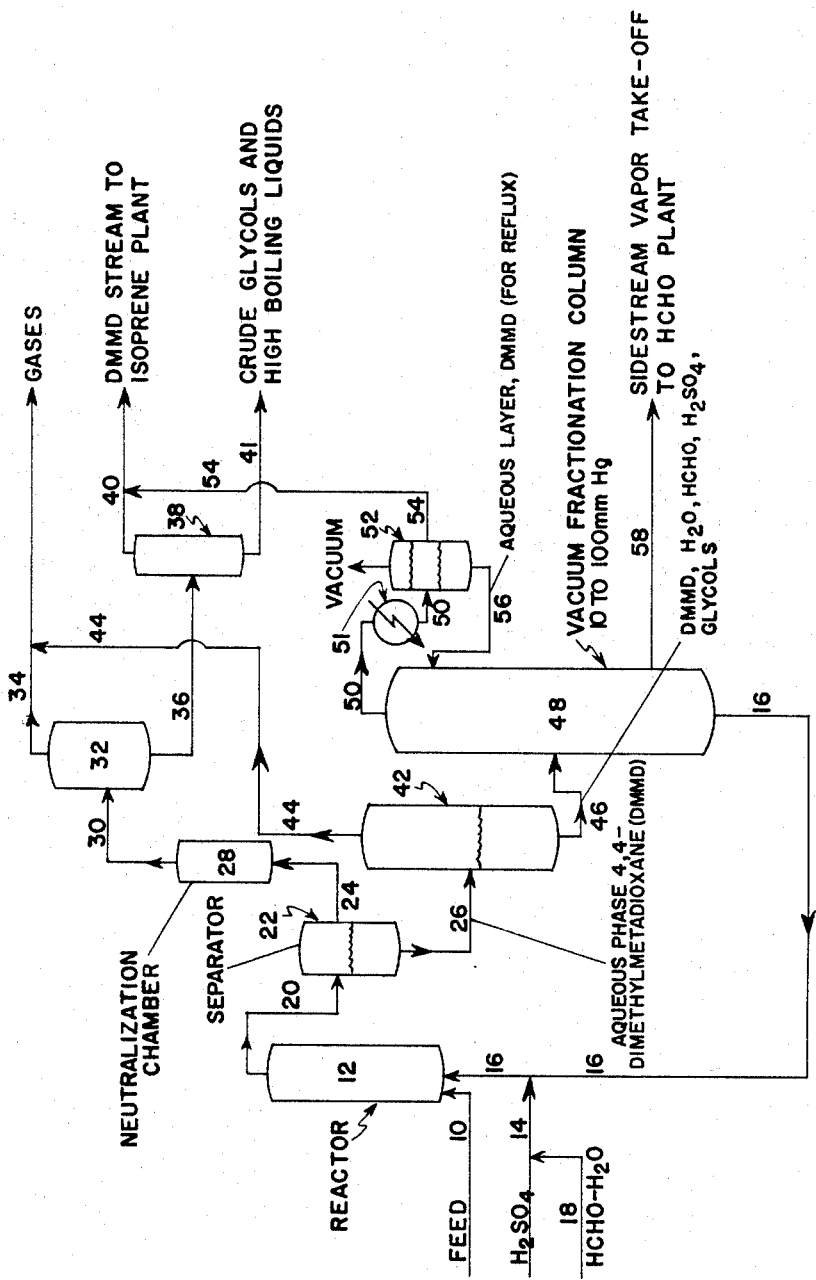

ABSTRACT OF THE DISCLOSURE

A process for the separation of 4,4-dimethylmetadioxane from admixture with water and a strong mineral acid, such as sulfuric acid, which comprises fractionally distilling said admixture at an absolute pressure of between 10 and 100 mm. of Hg.

---

This invention relates to a process for the preparation and separation of 4,4-dimethylmetadioxane (DMMD) from admixture with a strong mineral acid.

The preparation of DMMD by the condensation of isobutene with formaldehyde in the presence of a strong acid catalyst is known in the art. The reaction mixture from the condensation of isobutene and formaldehyde consists of an organic phase and a water phase. DMMD is present in both phases. The DMMD is normally separated, if desired, from the organic phase by atmospheric distillation after the small acid content in the organic phase has been neutralized. It was found that the DMMD could not be separated from the aqueous phase by atmospheric distillation, for the presence of a strong mineral acid promoted dehydration of the DMMD to isoprene. This latter finding was not surprising since it is known in the art that isoprene can be produced by the dehydration of DMMD in the presence of between 0.5 and 15.0 weight percent of a strong mineral acid at temperatures between 190° and 300° F. The production of isoprene, however, by the atmospheric distillation of the aqueous phase product from the isobutene-formaldehyde condensation reaction is not desired since the yields of isoprene are very poor due to the prevalence of unwanted side reactions such as the formation of formals and pyrans. The pyrans are formed by the reaction of isoprene with unreacted formaldehyde from the DMMD condensation stage and formaldehyde formed by dehydration of the DMMD. Thus, formaldehyde which is useful in the further production of additional amounts of DMMD is lost.

The aqueous phase could, of course, first be neutralized with a base such as sodium hydroxide and the DMMD subsequently separated by atmospheric distillation. This method obviously suffers from the disadvantage of the use of added chemicals coupled with a loss of large amounts of the strong mineral acid. By a strong mineral acid in this application is meant a mineral acid selected from the group consisting of $H_2SO_4$ and $H_3PO_4$.

It is one of the objects of this invention to separate DMMD substantially undecomposed from admixture with an aqueous strong mineral acid.

It is another object of the process of this invention to separate DMMD from admixture with an aqueous strong mineral acid and formaldehyde with a minimum concentration of formaldehyde in the DMMD, with a minimum loss of formaldehyde to side products, such as pyrans, and with a minimum dehydration of DMMD.

It is a further object of this invention to obtain an aqueous strong mineral acid stream, substantially free of DMMD, suitable for recycling to the isobutene-formaldehyde condensation step.

These and other objects are achieved in accordance with the invention which comprises a process for the separation of DMMD from a mixture comprising water, DMMD, and a strong mineral acid selected from the group consisting of $H_2SO_4$ and $H_3PO_4$ by fractional distillation of said mixture at an absolute pressure of between 10 and 100 millimeters of mercury. The weight percent water in the mixture is at least 40, and the weight percent of the strong mineral acid in the mixture is between 1 and 20.

In one embodiment of this invention, DMMD is separated from an aqueous mixture comprising DMMD, formaldehyde, water and a mineral acid selected from the group consisting of $H_2SO_4$ and $H_3PO_4$ by fractional distillation of said mixture at an absolute pressure of between 10 and 100 millimeters of mercury, said mixture obtained by a process comprising contacting isobutene with formaldehyde in the presence of an aqueous mineral acid as defined, collecting a reaction product, and thereafter separating said aqueous mixture from said reaction product.

The fractional distillation pressure for the process of this invention is critical. Fractional distillation at 760 millimeters at mercury (atmospheric pressure) results in the decomposition of the DMMD as discussed above. At atmospheric pressure the initial product from the column is isoprene. As the pressure at which fractional distillation occurs is reduced, the temperature in the still pot to obtain a vapor product is also reduced. However, it had previously been found that decomposition of DMMD to isoprene was promoted by a decrease in pressure and an increase in acid concentration. It was thus expected that the decrease in distillation pressure coupled with a high acid concentration (which is aggravated and gets progressively higher as components of the mixture are removed by distillation) would still result in dehydration of the DMMD. Unexpectedly, it was found that at fractional distillation pressures of 100 millimeters and less DMMD could be successfully removed as a DMMD-water azeotrope from admixture with a strong mineral acid. DMMD can be easily separated from the DMMD-water azeotrope by physical means such as decanting, since water has a low solubility in DMMD under the conditions at which the DMMD-water azeotrope leaves the vacuum fractionation column. Thus, the DMMD is recovered as DMMD, substantially undehydrated from admixture with an aqueous strong mineral acid, even though the acid is present in substantial concentrations.

As noted, the DMMD-water azeotrope from the vacuum fractionation column separates into an organic and aqueous layer on settling. The organic layer comprises between 95 and 98 weight percent DMMD and between 2 and 5 weight percent water. If the charge mixture contained formaldehyde, the organic layer would contain less than 2 weight percent formaldehyde. The aqueous layer comprises between 75 and 85 weight percent water and between 15 and 25 weight percent DMMD. Minor amounts of formaldehyde, say between 1 and 2 weight percent, would be present in the aqueous layer if there were any in the original charge. The aqueous layer is separated and recycled back to the vacuum distillation column as reflux. This reflux serves to recover substantially all of the DMMD and to maintain a low formaldehyde concentration in the DMMD-water azeotrope if formaldehyde is present.

The process of this invention has particular applicability when used to fractionate the aqueous phase product from the condensation of isobutene and formaldehyde in the presence of a strong mineral acid. This aqueous phase product comprises between 40 and 85 weight percent water; between 5 and 50 weight percent DMMD; between 1 and 20 weight percent of a strong mineral acid selected from the group consisting of $H_2SO_4$ and $H_3PO_4$; and between 2 and 25 weight percent formaldehyde. High boiling glycols, i.e., boiling higher than DMMD, can also be present in amounts between about 2 and 25 weight percent. This particular applicability occurs because a bottoms stream comprising the strong mineral acid and unreacted formaldehyde is obtained which can be recycled directly, without further processing, to the isobutene-formaldehyde condensation step. Any formaldehyde present in the mixture tends to concentrate in the bottoms from the vacuum fractionation column, since the water phase of the DMMD-water azeotrope is returned as reflux. However, it was found the water content of the bottoms stream was higher than desired for the condensation reaction stage.

It was further found that a weak formaldehyde-water sidestream could be removed from the vacuum fractionation column so as to reduce the water content of the bottoms stream to the desired extent.

The bottoms from the vacuum distillation column comprises formaldehyde, water, the strong mineral acid and high boiling glycols and is suitable, as noted above, for recycling to the DMMD formation stage. The concentration of formaldehyde generally varies between 15 and 30 weight percent of the bottom stream while the concentration of water is generally between 30 and 50 weight percent. The concentration of strong mineral acid depends in part on whether $H_2SO_4$ or $H_3PO_4$ is employed as the acid in the DMMD formation step. If sulfuric acid is employed, the $H_2SO_4$ content of the recycle stream is generally between 20 and 40 weight percent. If $H_3PO_4$ is employed, the $H_3PO_4$ content is generally between 40 and 60 weight percent.

The amount of water present in the mixture comprising DMMD, water and a strong mineral acid is also critical. Sufficient water must, of course, be present to form the DMMD-water azeotrope. The DMMD-water azeotrope can contain between 40 and 55 weight percent water and 45 and 60 weight percent DMMD.

Sufficient additional water must also be present, however, to keep the acid concentration in the bottoms below 55 weight percent and preferably below 50, and more preferably between 20 and 45 weight percent, depending on the acid employed as discussed below, or charring of the organic components will occur. The water content of the mixture comprising water, DMMD and a strong mineral acid is, therefore, at least 40 weight percent of the mixture, and is generally between 40 and 75 weight percent of the mixture. The water content is preferably between 60 and 70 weight percent of the mixture.

As noted above, the strong mineral acid is defined herein as a mineral acid selected from the group consisting of $H_2SO_4$ and $H_3PO_4$. The amount of acid in the DMMD-water-acid mixture can vary between 1 and 25 weight percent. The amount of acid in the aqueous phase of the product from the condensation of isobutene and formaldehyde varies depending on the acid employed as the catalyst. If sulfuric acid is employed, the $H_2SO_4$ content of the aqueous phase of the product generally varies between 1 and 15 weight percent. If $H_3PO_4$ is employed, the $H_3PO_4$ content of the aqueous phase of the product generally varies between 5 and 25 weight percent.

The amount of DMMD in the mixture can vary between 5 and 58 weight percent.

The invention will be further described with reference to the attached flow diagram.

A charge stock comprising isobutene enters reactor 12 through line 10. The strong mineral acid, in this case aqueous $H_2SO_4$, enters reactor 12 through lines 14 and 16. Sulfuric acid having an $H_2SO_4$ content between 96 and 98 weight percent (or any commercial grade) is suitable for use in reactor 12.

Aqueous formaldehyde containing between 15 and 45 weight percent formaldehyde enters through line 18 and is combined with the sulfuric acid in line 14. The mol ratio of formaldehyde to isobutene in reactor 12 is at least 2:1 and is preferably between 2.1:1 and 3:1. The weight ratio of formaldehyde to water in reactor 12 is at least 1:4 and is preferably between 3:7 and 2:3, while the $H_2SO_4$ content based on the formaldehyde-water content is between 2 and 15 weight percent and is preferably between 3 and 8 weight percent. If phosphoric acid is employed, the weight percent of phosphoric acid based on the formaldehyde-water content would be between 5 and 25 weight percent.

The amount of water should not exceed 40 percent by weight of the formaldehyde since this would promote the formation of undesired tertiary butyl alcohol. When the amount of water is less than 20 percent by weight of the formaldehyde, the desired yield of 4,4-dimethylmetadioxane decreases in favor of heavier glycol type products.

It is to be understood that the term formaldehyde includes its polymeric forms, such as paraformaldehyde.

The reaction conditions in reactor 12 include a temperature between 200° and 250° F., preferably between 210° and 220° F. Temperatures below about 200° F. reduce the yield of DMMD below the desired level. Temperatures above about 250° F. result in decomposition of the desired end products and the formation of undesired by-products.

The reaction pressure can vary between 300 and 500 p.s.i.g., with preferred pressures between 350 and 400 p.s.i.g.

The holding or reaction time in reactor 12 can be between 0.10 and 0.20 hour with preferred reaction times between 0.13 and 0.15 hour. The reaction time corresponds to a liquid hourly space velocity for the total feed of between 4 and 6, preferably between 3 and 5.

The reactor 12 is also provided with means for stirring (not shown). The products leave reactor 12 through line 20 and enter a separator 22 where an organic layer is removed overhead through line 24 and an aqueous layer is removed out the bottom through line 26.

The organic layer, containing the bulk of the DMMD, is neutralized in 28 by the addition of any suitable base, such as calcium oxide or sodium hydroxide. The neutralized organic layer is removed via line 30 and enters flash distillation column 32 where unreacted isobutene and other gases are removed overhead via line 34 and disposed of as desired. The liquid is removed from column 32 via line 36 and enters flash column 38 where, at atmospheric pressure and a top temperature of about 270° F., the DMMD is removed overhead and sent via line 40 to further processing and crude glycols and heavier products are removed out line 41.

As noted above, an aqueous layer is removed from separator 22 via line 26 and enters a liquid gas separator 42 operated at atmospheric pressure and a top temperature of 100° F. Unreacted light gases leave the top of separator 42 via line 44 and can be combined with the gases in line 34, if desired.

The liquid layer from separator 42 comprises between 5 and 50 weight percent DMMD; between 40 and 85 weight percent water; between 2 and 25 weight percent formaldehyde; between 1 and 20 weight percent $H_2SO_4$; and between 2 and 5 weight percent of higher boiling glycols. This liquid layer is passed via line 46 to vacuum distillation column 48 operated at a pressure of between 10 and 100 millimeters of mercury, a top temperature of between 50° and 130° F. and a bottom temperature of between 80° and 160° F.

A DMMD-water azeotrope is removed out the top of column 48 via line 50, is cooled in cooler 51 to a temperature between 40° F. at 10 millimeters of mercury and 120° F. at 100 millimeters, and enters separator 52 where an organic layer comprising between 95 and 98 weight percent DMMD and between 2 and 5 weight percent water is removed via line 54 and can be combined with the DMMD in line 40 for further processing.

A water layer containing between 15 and 25 weight percent DMMD is removed from separator 52 via line 56 and is returned to tower 48 as reflux.

A water-formaldehyde solution containing between 3 and 4 weight percent formaldehyde is removed from column 48 via line 58 for further processing. The purpose of removing this stream is to reduce the amount of water in the bottoms.

A bottoms stream is removed from column 48 and is recycled to reactor 12 via line 16. This bottoms stream, as noted above, comprises between 15 and 30 weight percent formaldehyde, between 30 and 50 weight percent water, between 20 and 40 weight percent $H_2SO_4$, and between 4 and 15 weight percent higher boiling glycols.

This invention will be further described with reference to the following specific examples.

Three batch vacuum distillation runs were made. A synthetic charge of about 200 milliliters DMMD and about 300 milliliters of 15 percent by weight aqueous formaldehyde was placed in the distilling flask. Three experiments were made in which varying concentrations of $H_2SO_4$ were added to the synthetic charge mixture. Each charge was distilled under 50 millimeters mercury absolute pressure until 300 milliliters of overhead product were obtained. The overhead product contained a water layer and an organic layer. These layers were separated and weighed. The DMMD was salted out of the water layer by using excess sodium sulfate. Analysis was made for the formaldehyde content of each layer. The pot bottoms were collected, weighed, and analyzed for formaldehyde, DMMD and acid. The results are given in Table I below.

TABLE I.—BATCH VACUUM DISTILLATION OF MIXTURES OF DMMD, HCHO, $H_2O$ AND $H_2SO_4$

| | Run Number | | |
|---|---|---|---|
| | 1 | 2 | 3 |
| Charge Stock: | | | |
| Formaldehyde: | | | |
| Grams | 47.3 | 45.6 | 48.3 |
| Percent by weight | 9.7 | 8.7 | 9.5 |
| DMMD: | | | |
| Grams | 189.0 | 190.5 | 190.9 |
| Percent by weight | 38.7 | 36.3 | 37.4 |
| Water: | | | |
| Grams | 252.5 | 256.5 | 255.2 |
| Percent by weight | 51.6 | 48.8 | 49.9 |
| $H_2SO_4$: | | | |
| Grams | 0 | 32.5 | 16.6 |
| Percent by weight | 0 | 6.2 | 3.2 |
| Operating Conditions: | | | |
| Pressure, mm. mercury absolute | 50 | 50 | 50 |
| Temperature, °F.[1] | 94 | 96 | 96 |
| Over-all Recovery: | | | |
| Total Recovery, percent by weight | 97.4 | 99.2 | 99.3 |
| DMMD, percent by weight | 97.4 | 97.2 | 95.9 |
| HCHO, percent by weight | 101.8 | 99.5 | 101.8 |
| Product Distribution: | | | |
| Top Layer, Grams | 164.2 | 164.0 | 166.8 |
| Bottom Layer, Grams | 126.8 | 122.8 | 108.9 |
| Formaldehyde Distribution: | | | |
| In total overhead, percent by weight | 5.2 | 16.2 | 12.5 |
| (a) In top DMMD layer, percent by weight | 0.44 | 1.24 | 1.40 |
| (b) In bottom water layer, percent by weight | 4.75 | 14.96 | 11.12 |
| In total residue, percent by weight | 94.8 | 83.8 | 87.5 |

[1] Vapor temperature of the DMMD-water azeotropic mixture.

Referring to Table I, no apparent decomposition of the formaldehyde or DMMD was observed as shown by the high material recoveries. While the percent formaldehyde in the overheads increased from 5.2 percent by weight of the formaldehyde charged with no acid present to 16.29 by weight of the formaldehyde charged with 10 percent by weight of sulfuric acid in the feed, about 90 percent by weight of the total formaldehyde in the overheads was present in the water phase.

A continuous vacuum fractionation system was also evaluated. Three runs (Runs 4, 5 and 6) were made with synthetic mixtures of DMMD; HCHO; $H_2SO_4$ and $H_2O$. The fractionation occurred in a 25 plate Oldershaw column with a side stream "vapor take-off" between the fifth and sixth tray above the still pot. The various product streams will be related to the take-off stream lines for the vacuum fractionation column 48 shown in the figure. This side stream vapor take-off corresponds to line 58 in the figure. Feed plate was between the fifteenth and sixteenth trays above the still pot. The overhead vapors came over at a temperature between 90° and 98° F. at a pressure between 47 and 52 mm. of mercury absolute. The overhead vapors were condensed in condenser 51 at a temperature of about 80° F., and collected in a separator 52. The lower aqueous layer at a temperature of 80° F. was fed back to the top plate of the column through line 56. The upper organic layer termed "Distillate" in Table II below, was removed. Any vapors leaving the overhead separator were caught in a cold trap (not shown on the figure). Data on the three continuous runs are given in Table II below. A control valve limited the pot liquid take-off through line 16.

TABLE II.—CONTINUOUS VACUUM FRACTIONATION OF MIXTURES OF DMMD, HCHO, $H_2SO_4$, AND $H_2O$

| | Run Number | | |
|---|---|---|---|
| | 4 | 5 | 6 |
| Charge Stock: | | | |
| (1) DMMD: | | | |
| Grams | 127.6 | 140.6 | 163.7 |
| Percent by weight | 10.8 | 12.2 | 15.7 |
| (2) Formaldehyde: | | | |
| Grams | 155.0 | 135.7 | 136.1 |
| Percent by weight | 13.2 | 11.8 | 13.0 |
| (3) Water: | | | |
| Grams | 765.7 | 780.7 | 724.6 |
| Percent by weight | 72.2 | 67.8 | 69.3 |
| (4) $H_2SO_4$: | | | |
| Grams | 45.6 | 94.1 | 20.8 |
| Percent by weight | 3.8 | 8.2 | 2.0 |
| Operating Conditions: | | | |
| Pressure, mm. mercury absolute | 52 | 50 | 47 |
| Feed Plate Temp., °F. (between 15th and 16th plates from still pot) | 108 | 100 | 97 |
| Overhead Vapor Temp., °F. | 98 | 90 | 90 |
| Liquid Feed Rate, ml./hr | 160 | 178 | 177 |
| Bottoms Vapor Take-off Rate, ml./hr | 21 | 75 | 75 |
| Bottoms Liquid Take-off Rate, ml./hr | 126 | 90 | 79 |
| Distillate Take-off Rate, ml./hr | 13 | 13 | 23 |
| Pot Bottoms Temp., °F. | | 122 | 118 |
| Over-all Recovery, percent by weight of Charge: | | | |
| DMMD | 100.9 | 96.4 | 98.6 |
| Formaldehyde | 91.4 | 97.9 | 96.6 |
| Water | 99.3 | 98.1 | 99.8 |
| $H_2SO_4$ | 100.7 | 98.8 | 103.8 |
| DMMD Distribution, percent by weight of Total: | | | |
| Distillate | 48.2 | 45.4 | 58.8 |
| Overheads Separator | 24.3 | 18.9 | 20.5 |
| Pot Bottoms | 0 | 0 | 0 |
| Pot Vapor Take-Off | 0 | 22.3 | 18.0 |
| Pot Liquid Take-Off | 0 | 0 | 0 |
| Cold Trap | 28.5 | 10.0 | 1.2 |
| Formaldehyde Distribution, percent by weight of Total: | | | |
| Distillate | 0.63 | 0.33 | 0.56 |
| Overheads Separator | 0.05 | 0.11 | 0.70 |
| Pot Bottoms | 40.13 | 43.29 | 40.20 |
| Pot Vapor Take-Off | 3.32 | 14.97 | 14.20 |
| Pot Liquid Take-Off | 46.21 | 39.05 | 40.95 |
| Cold Trap | 1.03 | 0.15 | 0 |
| Water Distribution, percent by weight of Total: | | | |
| Distillate | 0.34 | 0.17 | 0.27 |
| Overheads Separator | 1.36 | 0.07 | 1.40 |
| Pot Bottoms | 43.32 | 36.21 | 32.28 |
| Pot Vapor Take-Off | 10.35 | 27.47 | 31.69 |
| Pot Liquid Take-Off | 43.91 | 32.67 | 34.15 |
| Cold Trap | 3.53 | 1.52 | 0.01 |
| Acid Distribution, percent by weight of Total: | | | |
| Distillate | 0.007 | 0.073 | 0.024 |
| Overheads Separator | 0.005 | 0.002 | 0.011 |
| Pot Bottoms | 45.73 | 52.75 | 49.31 |
| Pot Vapor Take-Off | 0.15 | 0.027 | 0.130 |
| Pot Liquid Take-Off | 54.75 | 45.98 | 54.29 |
| Cold Trap | 0.075 | 0.012 | 0 |
| Product Distribution: | | | |
| Distillate: | | | |
| Grams | 65.1 | 65.6 | 99.1 |
| Percent by weight of Charge | 5.53 | 5.7 | 9.48 |
| DMMD, percent by weight | 95.515 | 97.31 | 97.285 |
| HCHO, percent by weight | 1.48 | 0.68 | 0.71 |
| Water, percent by weight | 4.00 | 2.00 | 2.00 |
| $H_2SO_4$, percent by weight | 0.005 | 0.01 | 0.005 |
| Overheads Separator: | | | |
| Grams | 41.5 | 27.2 | 44.7 |
| Percent by weight of Charge | 3.52 | 2.36 | 4.28 |
| DMMD, percent by weight | 74.72 | 97.46 | 75.175 |
| HCHO, percent by weight | 0.20 | 0.535 | 2.14 |
| Water, percent by weight | 25.06 | 2.00 | 22.68 |
| $H_2SO_4$, percent by weight | 0.005 | 0.005 | 0.005 |
| Pot Bottoms: | | | |
| Grams | 415.2 | 391.0 | 298.9 |
| Percent by weight of Charge | 35.25 | 33.97 | 28.59 |
| DMMD, percent by weight | 0 | 0 | 0 |
| HCHO, percent by weight | 14.98 | 15.02 | 18.30 |
| Water, percent by weight | 80.0 | 72.29 | 78.26 |
| $H_2SO_4$, percent by weight | 5.02 | 12.69 | 3.44 |

TABLE II—Continued

| | Run Number | | |
|---|---|---|---|
| | 4 | 5 | 6 |
| Pot Vapor Take-Off: | | | |
| Grams | 84.6 | 266.1 | 278.5 |
| Percent by weight of Charge | 7.18 | 23.12 | 26.65 |
| DMMD, percent by weight | 0 | 9.36 | 12.71 |
| HCHO, percent by weight | 6.08 | 7.94 | 6.94 |
| Water, percent by weight | 93.84 | 82.69 | 80.34 |
| $H_2SO_4$, percent by weight | 0.08 | 0.01 | 0.01 |
| Pot Liquid Take-Off: | | | |
| Grams | 433.3 | 351.3 | 314.5 |
| Percent by weight of Charge | 36.78 | 30.52 | 30.09 |
| DMMD, percent by weight | 0 | 0 | 0 |
| HCHO, percent by weight | 16.53 | 15.08 | 17.72 |
| Water, percent by weight | 77.71 | 72.61 | 78.69 |
| $H_2SO_4$, percent by weight | 5.76 | 12.31 | 3.59 |
| Cold Trap: | | | |
| Grams | 65.0 | 26.1 | 3.0 |
| Percent by weight of Charge | 5.52 | 2.27 | 0.19 |
| DMMD, percent by weight | 55.88 | 53.64 | 96.0 |
| HCHO, percent by weight | 2.46 | 0.76 | 0 |
| Water, percent by weight | 41.61 | 45.56 | 4.0 |
| $H_2SO_4$, percent by weight | 0.05 | 0.04 | 0 |

Referring to Table II, the "Over-all Recovery," "Distribution of Components" and "Product Distribution" were calculated from the average composition of the total stream quantities collected from the entire run plus the remaining material in the column still and receivers. The "Overheads Separator" and "Pot Bottoms" product distribution figures relate to the material remaining in the separator and pot bottoms respectively after the completion of the run.

It was found that the formaldehyde concentration in the distillate was fairly constant at about 0.6 percent by weight of the distillate regardless of the acid concentration in the feed. The amount of acid in the distillate was negligible, being only about 0.005 weight percent of the charge. The amount of acid in the vapor take-off was also small. Almost all of the acid and formaldehyde (but none of the DMMD) are in the pot liquid take-off and pot bottoms which can be recycled to the DMMD formation stage. The excellent over-all recoveries indicate little or no decomposition of the DMMD or formaldehyde despite the acid concentration in the pot going to about 50 percent by weight of the material in the pot and the pot temperature going as high as 122° F.

A seventh run was made to continuously vacuum fractionate the aqueous layer of a run where isobutene was condensed with formaldehyde. In the condensation reaction, 2.5 moles of a refinery butane-butene stream comprising about 18 weight percent isobutylene were fed continuously at the rate of 2700 ml./hr. into a 4 liter continuously stirred autoclave along with 1200 ml./hr. of a mixture of water, $H_2SO_4$ and formaldehyde. This latter mixture contained 57.3 weight percent water, 4.4 weight percent $H_2SO_4$ and 38.3 weight percent formaldehyde. The reaction conditions in the autoclave included a temperature of 215° F., a pressure of 375 p.s.i.g. and a contact time of about 0.13 hour. The product was removed and sent to a settling chamber. An aqueous layer having the composition shown in Table III below was removed and vacuum fractionated under the conditions shown in Table III. The over-all recoveries and distribution of components in the distillate, overhead separator, pot bottoms, pot vapor take-off, pot liquid take-off and cold trap are also shown in Table III below. These terms and their relationship to the figure are the same as in the continuous vacuum fractionation runs 4, 5 and 6 discussed above. Referring to Table III, the results are similar to those obtained from the synthetic mixture runs. The tertiary butyl alcohol in the feed came over with the DMMD in the distillate. If the DMMD is to be converted to isoprene, the tertiary butyl alcohol would pass through the isoprene reactor unchanged or be converted to isobutylene for recycle to the DMMD condensation step.

TABLE III.—CONTINUOUS VACUUM FRACTIONATION OF AQUEOUS LAYER OF FORMALDEHYDE-ISOBUTYLENE CONDENSATION RUN

| | Run 7 |
|---|---|
| Run conditions: | |
| Column pressure, mm. mercury absolute | 50 |
| Feed plate temperature, ° F. | 99 |
| Overhead vapor temperature, ° F. | 91 |
| Pot bottoms temperature, ° F. | 119 |
| Liquid feed rate, ml./hr. | 184 |
| Bottoms vapor take-off rate, ml./hr. | 54 |
| Bottoms liquid take-off rate, ml./hr. | 105 |
| Distillate take-off rate, ml./hr. | 25 |
| Charge: | |
| DMMD, gm. | 172.0 |
| DMMD, percent by weight | 12.8 |
| Formaldehyde, gm. | 97.9 |
| Formaldehyde, percent by weight | 7.3 |
| Water, gm. | 984.4 |
| Water, percent by weight | 73.5 |
| $H_2SO_4$, gm. | 24.9 |
| $H_2SO_4$, percent by weight | 1.9 |
| Tertiary butyl alcohol, gm. | 20.1 |
| Tertiary butyl alcohol, percent by weight | 1.5 |
| Glycols, gm. | 40.2 |
| Glycols, percent by weight | 3.0 |
| Over-all recovery, percent by weight of charge: | |
| DMMD | 97.8 |
| Formaldehyde | 103.7 |
| Water | 98.3 |
| $H_2SO_4$ | 104.3 |
| Tertiary butyl alcohol | 94.9 |
| Glycols | 104.0 |

| | (1) | (2) | (3) | (4) | (5) | (6) |
|---|---|---|---|---|---|---|
| Distribution of components, percent by weight of total: | | | | | | |
| Distillate | 61.7 | 1.3 | 0.25 | 0.03 | 63.5 | 0 |
| Overheads separator | 17.0 | 0.5 | 1.13 | 0.01 | 23.6 | 0 |
| Pot bottoms | 0 | 34.9 | 31.0 | 44.62 | 0 | 45.9 |
| Pot vapor take-off | 17.1 | 13.9 | 27.7 | 0.50 | 7.9 | 0 |
| Pot liquid take-off | 0 | 53.3 | 38.2 | 59.1 | 0 | 58.1 |
| Cold trap | 2.0 | 0 | 0 | 0 | 0 | 0 |

NOTE.—(1)=DMMD; (2)=HCHO; (3)=$H_2O$; (4)=$H_2SO_4$; (5)=TBA; (6)=Glycol.

| | Run 7 |
|---|---|
| Product distribution: | |
| Distillate, gm. | 122.6 |
| Distillate, percent by weight of charge | 9.16 |
| DMMD, percent by weight | 86.554 |
| HCHO, percent by weight | 1.04 |
| Water, percent by weight | 2.0 |
| $H_2SO_4$, percent by weight | 0.006 |
| Tertiary butyl alcohol, percent by weight | 10.4 |
| Glycol, percent by weight | 0 |
| Overheads separator, gm. | 45.5 |
| Overheads separator, percent by weight of charge | 3.40 |
| DMMD, percent by weight | 64.20 |
| HCHO, percent by weight | 0.99 |
| Water, percent by weight | 24.405 |
| $H_2SO_4$, percent by weight | 0.005 |
| Tertiary butyl alcohol, percent by weight | 10.4 |
| Glycol, percent by weight | 0 |
| Pot bottoms, gm. | 369.2 |
| Pot bottoms, percent by weight of charge | 27.56 |
| DMMD, percent by weight | 0 |
| HCHO, percent by weight | 9.24 |
| Water, percent by weight | 82.75 |
| $H_2SO_4$, percent by weight | 3.01 |
| Tertiary butyl alcohol, percent by weight | 0 |
| Glycol, percent by weight | 5.0 |
| Pot vapor take-off, gm. | 316.9 |
| Pot vapor take-off, percent by weight of charge | 23.65 |
| DMMD, percent by weight | 10.15 |
| HCHO, percent by weight | 4.27 |

| Product distribtuion | Run 7 |
|---|---|
| Water, percent by weight | 85.04 |
| $H_2SO_4$, percent by weight | 0.04 |
| Tertiary butyl alcohol, percent by weight | 0.5 |
| Glycol, percent by weight | 0 |
| Pot liquid take-off, gm. | 466.6 |
| Pot liquid take-off, percent by weight of charge | 34.83 |
| DMMD, percent by weight | 0 |
| HCHO, percent by weight | 11.17 |
| Water, percent by weight | 80.67 |
| $H_2SO_4$, percent by weight | 3.16 |
| Tertiary butyl alcohol, percent by weight | 0 |
| Glycol, percent by weight | 5.0 |
| Cold trap, gm. | 3.5 |
| Cold trap, percent by weight of charge | 0.06 |
| DMMD, percent by weight | 100.0 |

A series of runs were made on the pyrolysis of 4,4-dimethylmetadioxane to determine the effect of $H_2SO_4$ concentration on the conversion and yield of products such as isoprene and pyrans. The runs were made by passing a charge mixture consisting of 64 weight percent DMMD and 36 weight percent methanol and varying concentrations of $H_2SO_4$ through a coil reactor at a temperature of 305° F., a pressure of 110 p.s.i.g. and a liquid hourly space velocity of 18. The results are shown in Table IV below.

TABLE IV.—EFFECT OF CATALYST CONCENTRATION ON CONVERSION AND YIELDS CONDITIONS: 305° F., 110 p.s.i.g., 18 LHSV

| Run No. | Catalyst Concentration (percent by weight $H_2SO_4$) | DMMD Conversion (Mole percent) | Isoprene yield (Mole percent) | Pyran yield (Mole percent) |
|---|---|---|---|---|
| 8 | 0.40 | 40.19 | 20.52 | 3.88 |
| 9 | 0.50 | 41.20 | 24.72 | 5.49 |
| 10 | 0.60 | 38.17 | 27.88 | 17.00 |

Referring to Table IV, it can be seen that an increasing acid concentration results in higher yields of undesired pyrans. Although the temperatures in the vacuum fractionation in runs 4 through 7 above were lower, the $H_2SO_4$ concentration was so much higher (between 2 and 8 weight percent at the start of fractionation and as high as 30 weight percent at the finish) that from the data above, it was expected that decomposition of DMMD would occur.

Another series of runs were made on the pyrolysis of DMMD to study the effect of pressure. The results of these runs are shown on Table V below.

TABLE V.—EFFECT OF PRESSURE ON CONVERSIONS AND YIELDS CONDITIONS: 305° F., 0.50% $H_2SO_4$, 18 LHSV

| Run No. | Pressure, p.s.i.g. | DMMD Conversion (Mole percent) | Isoprene Yield (Mole percent) | Pyran Yield (Mole percent) |
|---|---|---|---|---|
| 11 | 80 | 53.00 | 27.32 | 8.02 |
| 12 | 90 | 49.03 | 27.44 | 7.41 |
| 13 | 100 | 45.08 | 26.61 | 6.57 |
| 14 | 110 | 41.20 | 24.72 | 5.49 |
| 15 | 120 | 37.44 | 21.53 | 4.17 |

Referring to Table V, as the pressure is reduced, the conversion, yield of isoprene and pyran yield all increase substantially. It would be expected from these data that further reductions in pressure would tend to aggravate the dehydration of DMMD and the production of unwanted pyrans, especially in the presence of high concentrations of $H_2SO_4$.

Another run was made to separate DMMD from a mixture comprising about 39.5 weight percent water; 59.5 weight percent DMMD and 1 weight percent p-toluene sulfonic acid by fractional distillation at a pressure of 760 mm. of mercury. The pot temperature was 280° F. After five hours the acid concentration in the pot had increased to five weight percent. A large amount of water insoluble polymer was formed and formaldehyde recovery was very poor. The recovery of DMMD, as DMMD and not as the decomposition reaction product of DMMD, was very low, being less than 50 weight percent.

The above run was repeated except the p-toluene sulfonic acid was replaced with oxalic acid. Between 20 and 30 weight percent of the DMMD was converted to isoprene even in the presence of this mild acid.

The results of these two runs should be compared with runs 1 through 7 above. In runs 1 through 7, using the process of this invention, over 95 weight percent of the DMMD was recovered as DMMD from admixture with water and a much stronger acid, namely sulfuric acid.

The above data substantiate the unexpected results of the process of this invention, namely, the separation of DMMD as DMMD, substantially undecomposed, from admixture with water and a strong mineral acid such as $H_2SO_4$. It is believed these results are achieved by combination of low temperature and short contact time, despite the low pressure of 10 to 100 mm. of mercury and the high and progressively increasing acid concentration. The separation process of this invention is advantageous in producing a stream of DMMD substantially free of formaldehyde and acid and a stream of formaldehyde and acid substantially free of DMMD and having the proper water content for recycle to the isobutene-formaldehyde condensation step.

Resort may be had to such variations and modifications as fall within the spirit of the invention and the scope of the appended claims.

I claim:

1. A process for the separation of 4,4-dimethylmetadioxane (DMMD) from a mixture comprising water, DMMD, and a strong mineral acid selected from the group consisting of $H_2SO_4$ and $H_3PO_4$, said mixture obtained from a reactor effluent which has been decanted as separable aqueous and organic phases, the aqueous phase constituting said mixture which comprises fractionally distilling said mixture at an absolute pressure of between 10 and 100 mm. of mercury, the weight percent water in said mixture being at least 40, and the weight percent of the strong mineral acid in said mixture being between 1 and 20.

2. A process according to claim 1 wherein the strong mineral acid is $H_2SO_4$.

3. A process according to claim 1 wherein the mixture comprises between 40 and 85 weight percentage $H_2O$; between 10 and 50 weight percent DMMD; between 1 and 20 weight percent of a strong mineral acid selected from the group consisting of $H_2SO_4$ and $H_3PO_4$, and between 2 and 25 weight percent formaldehyde.

4. A process according to claim 3 wherein the strong mineral acid is $H_2SO_4$ and the amount of acid in the mixture is between 2 and 10 weight percent.

5. In a process for making 4,4-dimethylmetadioxane (DMMD) which comprises reacting isobutene with an excess of formaldehyde in the presence of a strong mineral acid selected from the group consisting of $H_2SO_4$ and $H_3PO_4$ to form a mixture having an organic and an aqueous phase, the aqueous phase comprising the strong mineral acid, water, DMMD, and unreacted formaldehyde, the improvement which comprises decanting said aqueous phase containing 5 to 50 percent by weight DMMD from the said organic phase formed in the reaction zone recovering DMMD from the aqueous phase by subjecting said phase to fractional distillation at an absolute pressure of between 10 and 100 mm. of mercury.

6. A process for the separation of DMMD from a mixture comprising DMMD, water, a strong mineral acid and HCHO, said mixture being the aqueous phase of the reaction product obtained by condensing isobutene with an excess of HCHO in the presence of said strong mineral acid, which comprises decanting said aqueous phase containing 5 to 50 percent by weight DMMD from the organic phase subjecting said mixture to fractional distillation in a fractionation distillation zone at an absolute pressure of between 10 and 100 mm. of mercury, removing a water-DMMD azeotrope as an overhead product, and separating an organic layer substantially free of HCHO from said azeotrope.

7. A process for the separation of DMMD from a mixture comprising DMMD, water, a strong mineral acid and HCHO, said mixture being the aqueous phase of the reaction product obtained by condensing isobutene with an excess of HCHO in the presence of said strong mineral acid and decanting the aqueous phase containing 5 to 50 percent by weight DMMD from an organic phase formed in the reaction zone, which comprises subjecting said mixture to continuous fractional distillation at an absolute pressure of between 10 and 100 mm. of mercury, removing a vaporous water-DMMD azeotrope as an overhead product, condensing said azeotrope, separating an organic phase substantially free of HCHO from said azeotrope, separating a second aqueous phase from said condensed azeotrope and returning said second aqueous phase to said fractional distillation zone as reflux, removing a side stream from said fractional distillation zone comprising water and HCHO, and recovering a liquid bottoms product from said fractional distillation zone substantially free of DMMD suitable for recycle to said isobutene condensation step.

8. A process for the separation of DMMD from a mixture comprising between 40 and 85 weight percent water; between 5 and 50 weight percent DMMD; between 1 and 20 weight percent of a strong mineral acid selected from the group consisting of $H_2SO_4$ and $H_3PO_4$; and between 2 and 25 weight percent formaldehyde, said mixture obtained from a reactor effluent which has been decanted as separable aqueous and organic phases, the aqueous phase constituting said mixture which comprises fractionally distilling said mixture at an absolute pressure of between 10 and 100 millimeters of mercury in a fractional distillation zone removing a water-DMMD azeotrope as an overhead product, condensing said azeotrope, separating an organic phase comprising DMMD, as DMMD, substantially free of formaldehyde from said azeotrope, separating an aqueous phase from said condensed azeotrope and returning said aqueous phase to said fractional distillation zone as reflux, removing a side stream from said fractional distillation zone comprising water and formaldehyde, recovering a liquid bottoms substantially free of DMMD from said fractional distillation zone comprising between 15 and 30 weight percent formaldehyde; between 30 and 50 weight percent water; and between 20 and 40 weight percent of a strong mineral acid selected from the group consisting of $H_2SO_4$ and $H_3PO_4$.

References Cited

UNITED STATES PATENTS

| | | | |
|---|---|---|---|
| 2,729,650 | 1/1956 | Habeshaw | 260—340.7 |
| 2,856,412 | 10/1958 | Wheeler | 260—340.7 |
| 2,962,507 | 11/1960 | Hellin | 260—340.7 |
| 2,987,524 | 6/1961 | Fischer | 260—340.7 |
| 2,997,480 | 8/1961 | Hellin | 260—340.7 |
| 3,036,090 | 6/1962 | Wheeler | 260—340.7 |
| 3,154,563 | 10/1964 | Kronig | 260—340.7 |
| 3,216,963 | 10/1965 | Wheeler | 260—340.7 |

FOREIGN PATENTS 884,808  12/1961  Great Britain.

NORMAN YUDKOFF, *Primary Examiner.*

D. EDWARDS, *Assistant Examiner.*